United States Patent
Hirata et al.

(10) Patent No.: US 8,221,339 B2
(45) Date of Patent: Jul. 17, 2012

(54) FEMORAL SUPPORT MEMBER FOR A WALKING ASSISTANCE DEVICE

(75) Inventors: Takashi Hirata, Wako (JP); Taiji Koyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 12/679,679

(22) PCT Filed: Aug. 29, 2008

(86) PCT No.: PCT/JP2008/002374
§ 371 (c)(1),
(2), (4) Date: Mar. 24, 2010

(87) PCT Pub. No.: WO2009/040987
PCT Pub. Date: Apr. 2, 2009

(65) Prior Publication Data
US 2010/0198116 A1    Aug. 5, 2010

(30) Foreign Application Priority Data

Sep. 25, 2007 (JP) ................................. 2007-247535
May 22, 2008 (JP) ................................. 2008-134086

(51) Int. Cl.
*A61F 5/00* (2006.01)
*A61H 1/02* (2006.01)

(52) U.S. Cl. ................. 602/23; 602/16; 601/34

(58) Field of Classification Search ............... 602/23, 602/16; 128/99.1, 100.1, 101.1, 102.1; 601/34
See application file for complete search history.

(56) References Cited

U.S. PATENT DOCUMENTS

| | | | | |
|---|---|---|---|---|
| 5,472,412 A * | 12/1995 | Knoth | .............. | 602/26 |
| 5,554,104 A * | 9/1996 | Grim | .............. | 602/8 |
| 5,749,840 A * | 5/1998 | Mitchell et al. | .............. | 602/5 |
| 6,064,912 A * | 5/2000 | Kenney | .............. | 607/48 |
| 6,960,177 B2 * | 11/2005 | Turrini et al. | .............. | 602/26 |
| 7,367,958 B2 * | 5/2008 | McBean et al. | .............. | 602/16 |
| 2006/0135903 A1 * | 6/2006 | Ingimundarson et al. | ...... | 602/26 |
| 2006/0178605 A1 * | 8/2006 | Sauber et al. | .............. | 602/16 |
| 2006/0258967 A1 * | 11/2006 | Fujil et al. | .............. | 602/23 |
| 2006/0264790 A1 * | 11/2006 | Kruijsen et al. | .............. | 602/16 |
| 2008/0125685 A1 * | 5/2008 | Bernardoni | .............. | 602/32 |
| 2009/0299243 A1 * | 12/2009 | Hirata et al. | .............. | 602/23 |

FOREIGN PATENT DOCUMENTS

| | | |
|---|---|---|
| JP | 2000-166997 | 6/2000 |
| JP | 2003-220102 | 8/2003 |
| JP | 2006-320349 | 11/2006 |
| JP | 2007-152035 | 6/2007 |

* cited by examiner

*Primary Examiner* — Quynh-Nhu H Vu
(74) *Attorney, Agent, or Firm* — Squire Sanders (US) LLP

(57) ABSTRACT

A femoral support member (30) comprises a stiff frame (31) made of an elongated rectangular plate member curved so as to extend along an outer side and front of a femoral part of a wearer and a flexible belt (32) extending along a rear of the femoral part. The femoral support member allows a walking assistance force to be transmitted to the femoral part of the wearer in a favorable manner. Also, the pressure and stress on the wearer are minimized, and a favorable fit can be achieved.

5 Claims, 5 Drawing Sheets

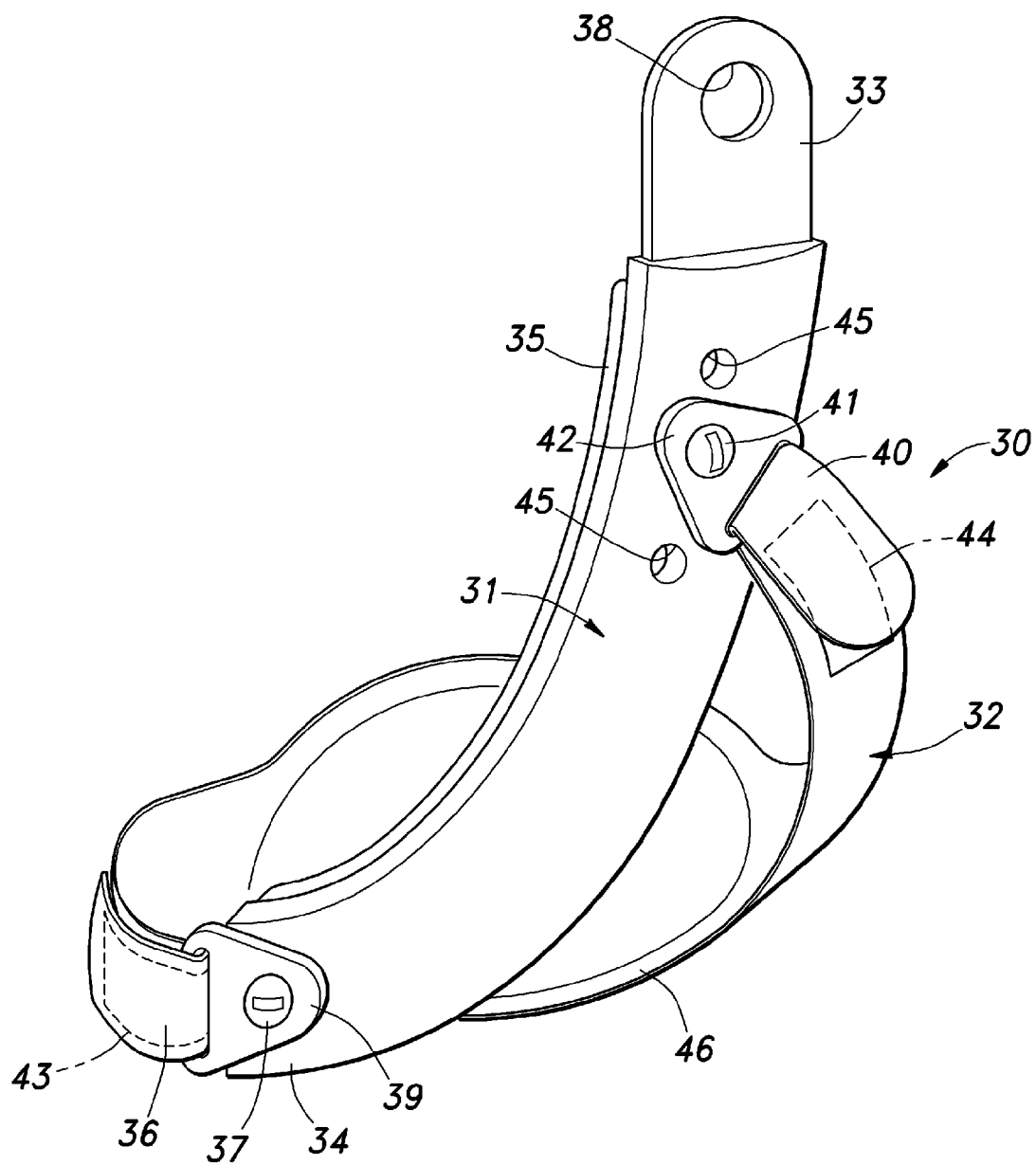

FEMORAL SUPPORT MEMBER FOR A WALKING ASSISTANCE DEVICE

TECHNICAL FIELD

The present invention relates to a femoral support member for a walking assistance device, and in particular to a femoral support member configured to be secured to a femoral part of a human wearer for transmitting an assisting force generated by a power actuator to the femoral part.

BACKGROUND OF THE INVENTION

For providing an assistance to a person who has a difficulty in walking by himself owing to the lack of muscular force, and an aid in a walking rehabilitation, it has been proposed to use a walking assistance device that provides a power assist to the effort of a wearer to walk. Typically, a walking assistance device of this type comprises a power actuator consisting of an electric motor or the like and secured to a waist or hip part of the wearer and a femoral support member secured to a femoral part of the wearer, and the femoral assisting force generated by the power actuator is transmitted to the femoral part of the wearer via the femoral support member. See Japanese patent laid open publication No. 2000-166997 (patent document 1), for instance.

The femoral support member disclosed in patent document 1 comprises an arm having a base end drivingly connected to a power actuator and a semi-cylindrical shell member attached to a free end of the arm and covering an outer half of the femoral part of the wearer. The femoral support member disclosed in Japanese patent laid open publication No. 2006-320349 (patent document 2) comprises an arm having a base end drivingly connected to a power actuator and a bifurcated stay member attached to a free end of the arm in a horizontal disposition, a pair of bifurcated free ends of the stay member interposing a femoral part of the wearer from front and behind via respective pad members supported by corresponding stiff support plates.

BRIEF SUMMARY OF THE INVENTION

Tasks to be Accomplished by the Invention

However, such conventional femoral support members have some problems. The semi-cylindrical shell covering the outer half of the wearer's femoral part does not favorably conform to the wearer as it is made of a relatively stiff material, and is therefore not entirely comfortable or free from stress to the wearer. Also, the presence of a stiff member engaging a rear part of the wearer's femoral part may cause a considerable discomfort to the wearer in a sitting posture.

When the femoral part of the wearer is interposed between a pair of pad members from front and behind, the distribution of the contact pressure on the femoral part of the wearer is not adequately evenly distributed, and the assisting force transmitted thereto tends to apply a localized pressure to the femoral part owing to a lever action so that there is a considerable difficulty in reducing stress and discomfort to the wearer in a satisfactory manner. Furthermore, in this case also, the presence of the stiff support plate and pad member prevents the wearer from sitting in a comfortable way.

Thus, a primary object of the present invention is to provide a femoral support member for a walking assistance device that minimizes stress and discomfort to the wearer, favorably fits on the wearer, and is capable of transmitting the assisting force to the femoral part in an efficient manner while allowing the wearer to sit without any discomfort.

Means to Accomplish the Tasks

The present invention provides a femoral support member for a walking assistance device configured to be worn on a femoral part of a wearer to transmit a femoral assisting force produced by a power actuator worn on a hip of the wearer to the femoral part of the wearer, comprising: a stiff frame made of an elongated rectangular plate member having a base end portion drivingly connected to an output of the power actuator and a free end portion extending from the base end portion along an outer side and front of the femoral part of the wearer following a curved contour thereof and terminating at a front part of the femoral part located above a knee cap of the wearer; and a flexible belt having a first end portion connected to the free end portion of the stiff frame and a second end portion connected to an intermediate part of the stiff frame between the base end portion and free end portion.

In the femoral support member for a walking assistance device according to the present invention, the flexible belt preferably comprises a laterally expanded portion in an intermediate part thereof.

In the femoral support member for a walking assistance device according to the present invention, the flexible belt is preferably provided with a fixture that allows adjustment of a length of the flexible belt between the base end portion and free end portion.

In the femoral support member for a walking assistance device according to the present invention, the stiff frame is preferably provided with a pad member on a surface engaging a femoral part of the wearer.

In the femoral support member for a walking assistance device according to the present invention, a surface skin of at least one of the flexible belt and pad member is made of material having a low frictional coefficient.

Effect of the Invention

The femoral support member for a walking assistance device of the present invention surrounds femoral part of the wearer in a pair of crossed loops by using the stiff frame and flexible belt, and the surrounding part transmits the femoral assisting force generated by a power actuator to the femoral part.

In this femoral support member, the stiff frame extends on the outer side and front of the femoral part of the wearer, but these parts are covered by relatively stiff muscles such as lateral great muscle and rectus femoris which remain unchanged in shape so that restraining such parts with the stiff frame does not cause any significant discomfort or stress to the wearer. Also, a large part of the stiff frame including the base end portion adjacent to the side of the hip (hip joint) of the wearer and the free end portion extending from the base end portion and terminating at a point adjacent to the knee cap of the wearer engages the outer side and front of the femoral part of the wearer to transmit the assisting force to the femoral part of the wearer, the applied pressure is widely distributed, and the pressure and stress applied to the wearer can be minimized.

The rear of the femoral part which experiences a large change in the shape of the muscle receives the femoral assisting force via the flexible belt which can accommodate a large change in shape so that a favorable fit can be achieved, and the even distribution of the force applied to the contact surface limits the maximum pressure level and minimizes discomfort to the user. In particular, only the flexible belt is present in the rear of the femoral part of the wearer, and there is no stiff frame or plate in the rear of the femoral part so that the wearer can sit while wearing the femoral support members without experiencing any undue discomfort.

DETAILED DESCRIPTION OF THE PREFERRED EMBODIMENTS

A preferred embodiment of the femoral support member for a walking assistance device of the present invention is described in the following with reference to the appended drawings.

The walking assistance device of the illustrated embodiment comprises a main body (hip support member) 10 configured to be worn on a hip or waist of a wearer by using a belly belt 20 in a detachable manner, and a pair of femoral support members 30 mounted on either side of the main body 10.

The main body 10 comprises a frame 13 made of stiff plastic material and including a middle portion 11 positioned in a central back part of the wearer and a pair of extensions 12 extending from either side of the wearer's hip, a power source/controller unit 14 attached to the middle portion 11 of the frame 13 and a pair of electric motor units 16 each attached to a free end of a corresponding one of the extensions 11 via a hinge 15 to provide an assist force for the movement of the femoral part of the wearer.

The power source/controller unit 14 is incorporated with a rechargeable batter and a controller unit consisting of a microcomputer.

Each hinge 15 suspends the corresponding electric motor unit 16 so as to be pivotable around a horizontal, fore-and-aft axial line. Thereby, the electric motor unit 16 hangs along the corresponding side of the hip (hip joint part), and can swing around the hinge axial line. The electric motor unit 16 when worn on a side of the hip of the wearer does not restrict or obstruct the movement of the hip joint of the wearer.

The electric motor unit 16 is incorporated with an electric motor not shown in the drawings, and the power source/controller unit 14 controls the supply of electric power to the electric motor so as to provide an assisting force for the femoral part of the wearer or assist the effort of the wearer to walk.

The side of the electric motor unit 16 facing the hip of the wearer is fitted with a pad member 17 stuffed with cushion material such as plastic foam.

The belly belt 20 includes a left belt segment 20L and a right belt segment 20R, each of which has one end passed through a belt ring 21, attached to a corresponding side of the middle portion 11 of the frame 13 via a pin, and passed through an adjusting belt buckle 22 so that the length of the belt segment 20L, 20R can be adjusted. The other end of each belt segment 20L, 20R is passed through an end of a releasable buckle 23 positioned centrally in front of the abdomen of the wearer, and folded back so as to extend away from the buckle 23. Thereafter, the belt segment 20L, 20R is passed through a belt ring 24, attached to a free end of the corresponding extension 12 of the frame 13 via a pin, via an adjusting belt buckle 25 so that the length of the belt segment 20L, 20R can be adjusted.

Thus, the belly belt 20 is passed along a front part of the wearer's abdomen in the shape of letter X in an adjustable manner, and is supported at four points. Therefore, the wearer is enabled to carry a relatively heavy article without causing undue burden on the hip of the wearer. The belly belt 20 is configured to be adjusted to different builds of the wearers and different preferences of the wearer.

Each femoral support member 30 is configured to be worn on a femoral part of the wearer to transmit the assisting force generated by the electric motor unit 16 to the femoral part, and comprises a stiff frame 31 and a flexible belt 32.

The stiff frame 31 consists of an elongated rectangular plate member, and comprises a base end portion 33 drivingly connected to the output of the electric motor unit 16, and a free end portion 34 extending from the base end portion 33 along the contour of the outer side and front side of the femoral part in a curved configuration and terminating at a part of the front side of the femoral part immediately above a knee cap of the wearer. The stiff frame 31 may be made of light metal such as aluminum, plastic, carbon reinforced plastic, fiber reinforced plastic and so on having a suitable hardness and stiffness.

More specifically, the major plane of the stiff frame 31 is twisted by about 90 degrees as it extends from the upper end or base end portion 33 to the lower end or free end portion 34. The base end portion 33 of the stiff frame 31 is formed with a through hole 38 for receiving an output shaft (not shown in the drawings) of the electric motor unit 16.

The side (contact surface side) of the stiff frame 31 facing the femoral part of the user is fitted with a pad member 35 stuffed with cushion material such as plastic foam.

The flexible belt 32 comprises a first end portion 36 connected to the free end portion 34 of the stiff frame 31 and a second end 40 connected to an intermediate part of the stiff frame 31 between the base end portion 33 and free end portion 34.

More specifically, the first end portion 36 of the flexible belt 32 is fixedly attached to a belt ring 39, pivotally attached to the free end portion 34 of the stiff frame 31 via a threaded bolt 37, and the second end of the flexible belt 32 is fixedly attached to a belt ring 42, pivotally attached to an intermediate part of the stiff frame 31 between the base end portion 33 and free end portion 34 via a threaded bolt 41. The flexible belt 32 is thus passed along an inner side and a rear side of the femoral part of the user.

The flexible belt 32 is made of flexible material having a high tensile strength, such as woven fabric, synthetic leather and genuine leather, and can freely conform to the outer contour of the wearer's femoral part.

The first end portion 36 and second end portion 39 of the flexible belt 32 are secured to the belt rings 38 and 42 in a detachable manner by using Velcro (trademark) fasteners or hook and loop fasteners 43 and 44, respectively, and can be adjusted of the length of the flexible belt 32 by changing the length of the folded back portion of each end portion.

The point of attachment of the other end 40 of the flexible belt 42 to the stiff frame 31 via the belt ring 42 is located in a part of the stiff frame 31 adjacent to the base end portion 33. By forming a plurality of through holes 45 for receiving the threaded bolt 41 along the length of the stiff frame 31 (the direction passing through the base end portion 33 and free end portion 34) at a prescribed interval and changing the point of securing the belt ring 42 by appropriately choosing one of the holes for receiving the threaded bolt 41, the point of attachment can be adjusted so as to suite the build and preference of the wearer.

The flexible belt 32 is provided with a laterally widened portion 46 in an intermediate part thereof between the first end portion 36 and second end portion 40 which is significantly wider than the first end portion, second end portion or lateral width of the stiff frame 31.

The pad members 17 and 35, and the surface skin of the flexible belt 32 may be made of material having a relatively low frictional coefficient such as nylon, polyester, polypropylene.

The advantages and effects of the femoral support member for a walking assistance device are summarized in the following.

(1) Because a large part of the stiff frame 31 extending from the base end portion 33 adjacent to a side of the hip (hip joint) to the free end portion 34 adjacent to a position slightly above the knee cap comes into contact with a large surface area ranging from an outer side and front side of the femoral part, and the assisting force is transmitted to the femoral part via this large area, the pressure caused by the assisting force can be distributed over the large surface area, and the pressure and stress on the wearer can be minimized.

When the assisting force is transmitted to the femoral part of the wearer via a pad member attached to a free end of the frame in a conventional manner, the assisting force is applied to a localized part of the femoral part owing to a lever action, and the contact surface does not remain fixed. However, by using a stiff frame as proposed by the present invention, such problems can be avoided.

(2) The stiff frame 31 is present on an outer side and front side of the femoral part of the wearer, but these parts are covered by substantial muscle formations, such as lateral great muscle and rectus femoris which remain unchanged in shape, so that fixing such parts by using the stiff frame 31 does not appreciably apply pressure or stress to the wearer.

(3) The assisting force is transmitted to the rear part of the femoral part of the wearer which is relatively soft and changes in shape significantly via the flexible belt capable of readily conforming to such changes in shape so that the pressure applied to the femoral part is evenly distributed, and the stress to the wearer can be minimized The laterally widened portion 46 provided in the intermediate part of the flexible belt 32 further improves the uniform distribution of pressure.

(4) As there is no stiff frame or plate on the rear side of the femoral part of the wearer, the femoral support member allows the wearer to sit comfortably.

(5) Because the femoral support member of the present invention is simple in structure and free from protrusions, the wearer can wear clothes such as pants over the femoral support member without disrupting the external appearance of the wearer.

(6) The flexible belt 32 can be configured to be adjustable of the length thereof so that a favorable fit can be achieved with ease, and the flexible belt 32 can be adapted to the particular build and preference of the wearer.

(7) On account of the pad member attached to the surface of the stiff frame engaging the femoral part, the hard surface of the stiff frame is prevented from causing discomfort to the wearer, and a favorable fit can be achieved.

(8) Because the surface skin of the pad members 17 and 35 and the flexible belt 32 is made of material having a low frictional coefficient, even when a relative movement should occur between the wearer's body and the opposing part of the walking assistance device, the femoral support member is allowed to move relative to the opposing part of the wearer with a very little friction, and this reduces the stress that may be otherwise applied to the wearer.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application and prior art references mentioned in the disclosure are incorporated in this application by reference.

BRIEF DESCRIPTION OF THE DRAWINGS

Now the present invention is described in the following with reference to the appended drawings, in which:

FIG. 5 is a perspective view of the femoral support member embodying the present invention.

GLOSSARY

Figure 1:
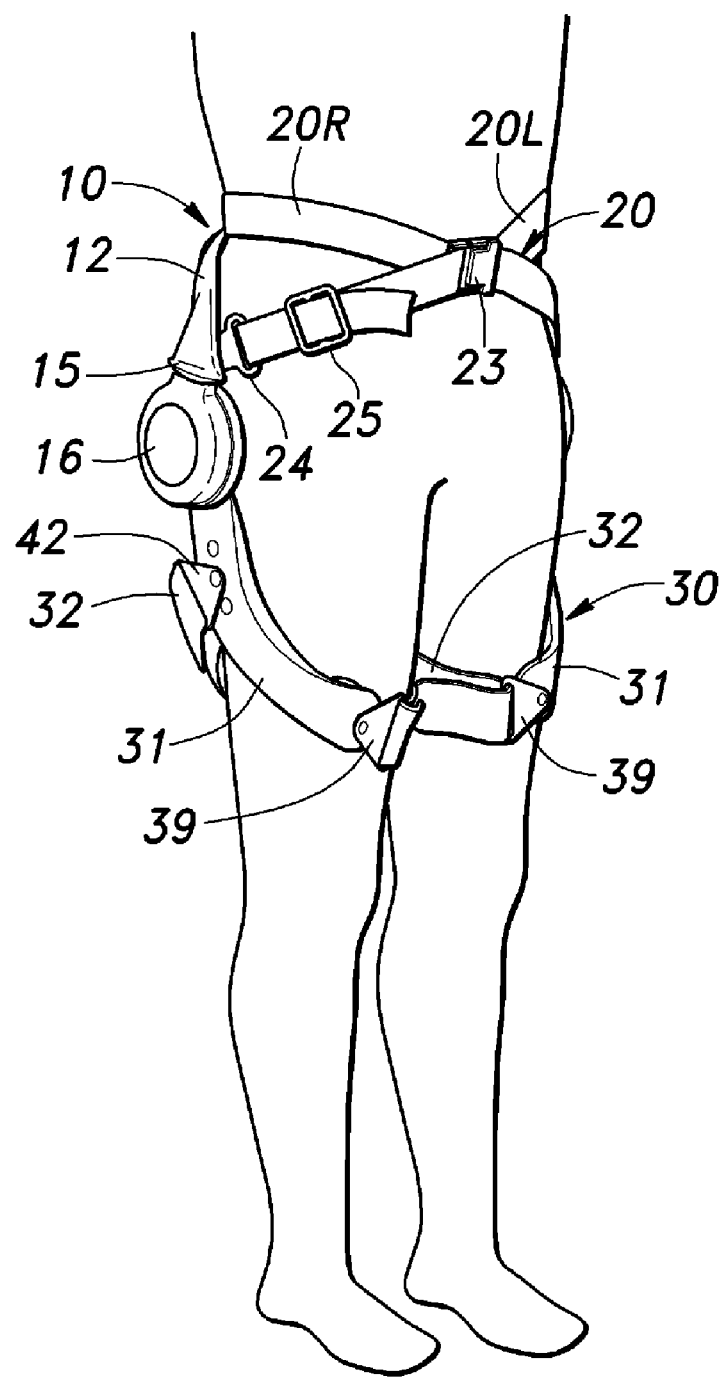
FIG. 1 is a front perspective view showing an overall structure of a walking assistance device fitted with a pair of femoral support members embodying the present invention in use.
Figure 2:
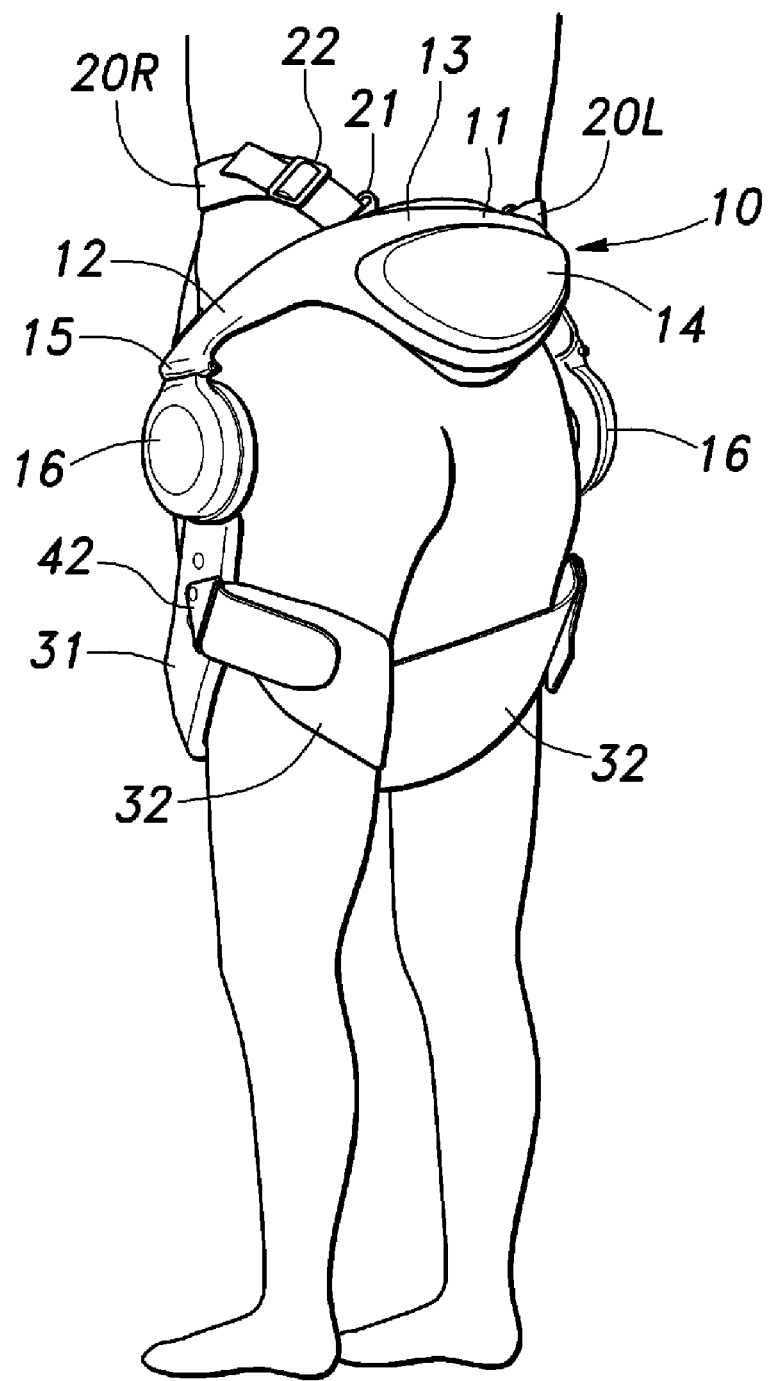
FIG. 2 is a rear perspective view showing the walking assistance device fitted with the pair of femoral support members embodying the present invention in use.
Figure 3:
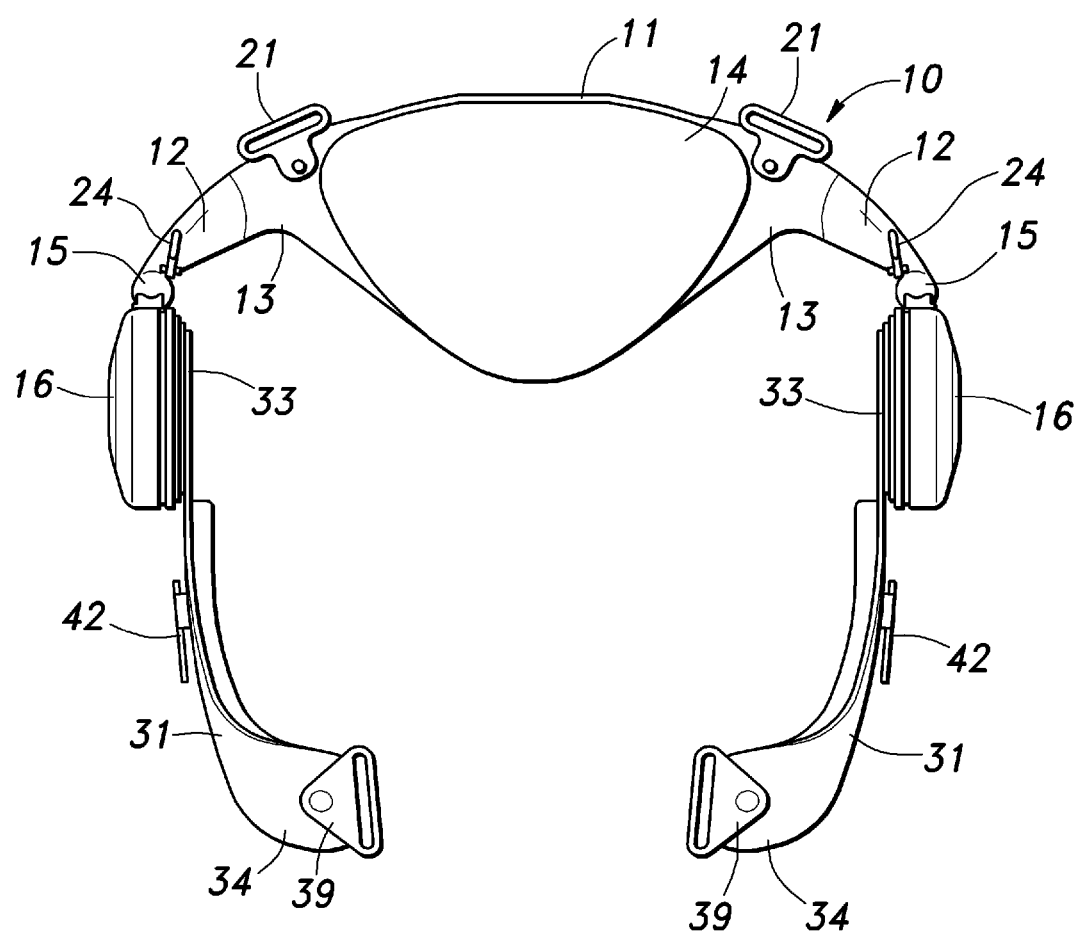
FIG. 3 is a front view of the walking assistance device fitted with the pair of femoral support members embodying the present invention with the flexible belts omitted from illustration.
Figure 4:
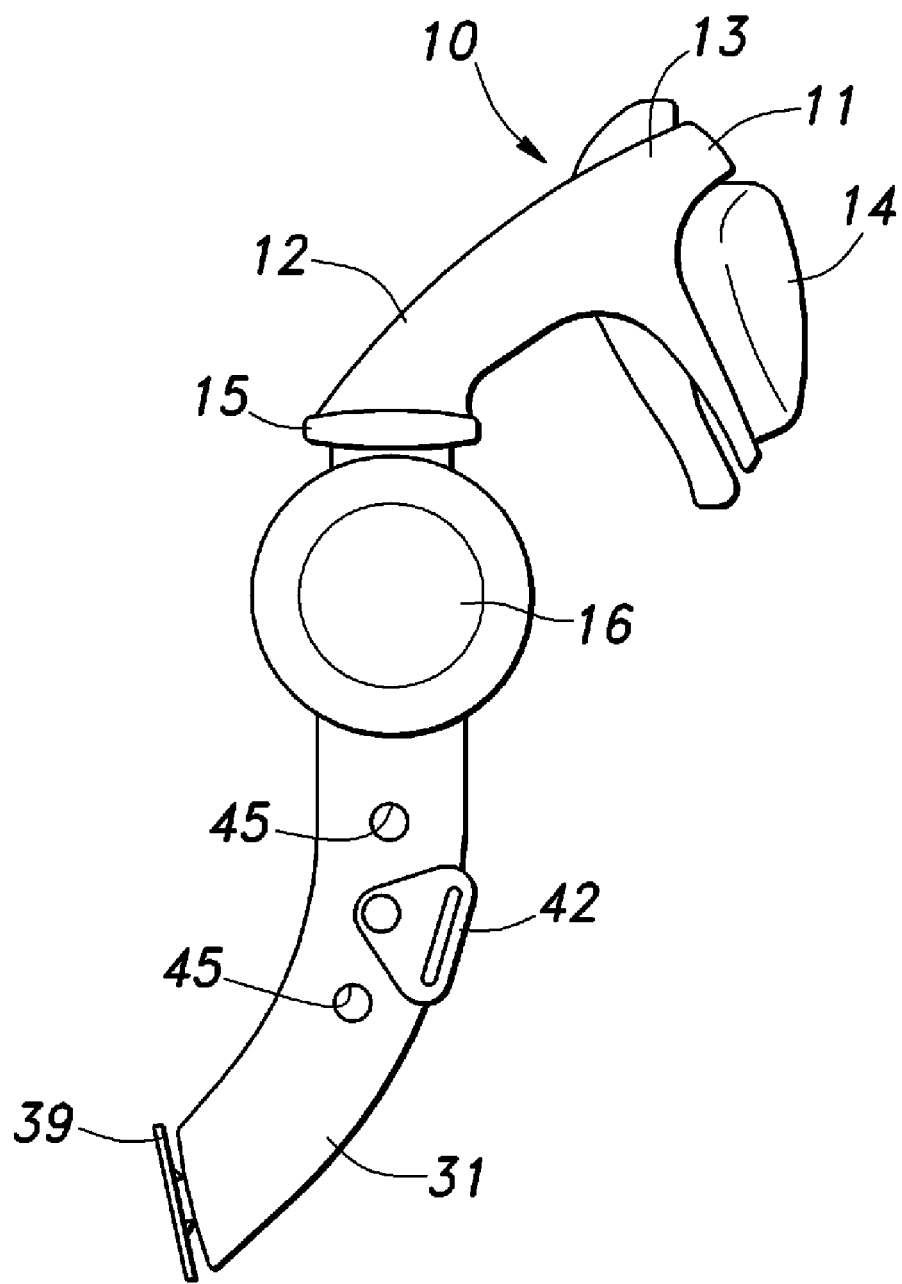
FIG. 4 is a side view of the walking assistance device fitted with the pair of femoral support members embodying the present invention with the flexible belts omitted from illustration.

| 10 | main body | 11 | middle portion |
|----|-----------|----|----------------|
| 12 | extension | 13 | frame |
| 14 | power source/controller unit | 15 | hinge |
| 16 | electric motor unit | 20 | belly belt |
| 30 | femoral support member | 31 | stiff frame |
| 32 | flexible belt | 33 | base end portion |
| 34 | free end portion | 35 | pad member |
| 36 | first end portion | 37 | threaded bolt |
| 38 | through hole | 39 | belt ring |
| 40 | second end portion | 41 | threaded bolt |
| 42 | belt ring | 43, 44 | hook and loop fastener |
| 45 | through hole | 46 | lateral extended part |

The invention claimed is:

1. A femoral support member for a walking assistance device configured to be worn on a femoral part of a wearer to transmit a femoral assisting force produced by a power actuator worn on a hip of the wearer to the femoral part of the wearer, comprising:
a stiff frame made of an elongated rectangular plate member having a base end portion drivingly connected to an output of the power actuator and a free end portion extending from the base end portion along an outer side and front of the femoral part of the wearer following a curved contour thereof and terminating at a front part of the femoral part located above a knee cap of the wearer; and
a flexible belt having a first end portion connected to the free end portion of the stiff frame and a second end portion connected to an intermediate part of the stiff frame between the base end portion and free end portion.

2. The femoral support member according to claim 1, wherein the flexible belt is provided with a fixture that allows adjustment of a length of the flexible belt between the base end portion and free end portion.

3. The femoral support member according to claim 1, wherein the flexible belt comprises a laterally expanded portion in an intermediate part thereof.

4. The femoral support member according to claim 1, wherein the stiff frame is provided with a pad member on a surface engaging a femoral part of the wearer.

5. The femoral support member according to claim 3, wherein a surface skin of at least one of the flexible belt and pad member is made of material having a low frictional coefficient.

* * * * *